UNITED STATES PATENT OFFICE 2,628,953

COMPOSITIONS OF MATTER STABILIZED WITH ISOBORNYL DERIVATIVES

Thomas H. Newby, Middlebury, Conn., assignor to United States Rubber Company, New York, N. Y., a corporation of New Jersey No Drawing. Application November 30, 1950, Serial No. 198,500

4 Claims. (Cl. 260—45.95)

This invention relates to new compositions of matter.

More particularly, it is concerned with the new chemical denoted 6,6'-methylene bis-(2-isobornyl-4-methyl phenol) and its use in rubber and allied unsaturated gums. It has been found to have superior antioxidant properties and can be used in unsaturated organic substances which deteriorate from absorption of oxygen (air), heat and/or light, among which are rubbers broadly, natural and synthetic, gasoline, transformer oils, fats, waxes, soaps, etc.

The aforesaid chemical may be prepared by reacting camphene with p-cresol in a 1:1 ratio, isolating the mono-isobornyl-p-cresol by distillation, and reacting it with formaldehyde, in a 2:1 ratio. The product thus obtained is a buff-colored solid which is an excellent antioxidant for rubber. However, if the product of the initial reaction is not distilled but is reacted directly with formaldehyde, the product is a solid also possessing great antioxidant powers. Such a product consists primarily of 6,6'-methylene bis-(2 - isobornyl - 4 - methyl phenol) with lesser amounts of 2,6-diisobornyl-4-methyl phenol and 6,6'-methylene bis-(4-methyl phenol).

The two reactions involved in preparing the said compound of my invention are as follows:

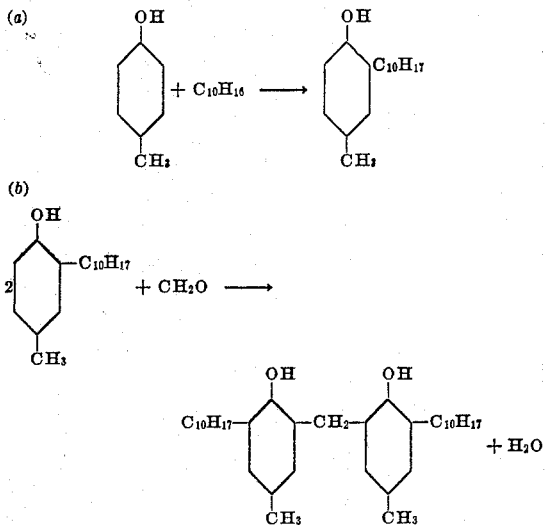

Any of the well-known Friedel-Crafts catalysts may be used in step (a), and either an acidic or basic catalyst may be used in step (b). A preferred catalyst for both reactions is boron fluoride etherate.

Aldehydes other than formaldehyde such as acetaldehyde, benzaldehyde, butyraldehyde, heptaldehyde, chloral, etc. also give products having antioxidant properties; however, the formaldehyde derivative is preferred. The aldehyde may be used in aqueous solution, in a polymeric form or as the pure aldehyde.

Examples of the other 6,6'-alkylidene bis-(2-isobornyl-4-methyl phenols) include 6,6'-benzylidene bis-(2-isobornyl-4-methyl phenol), 6,6'-butylidene bis-(2-isobornyl-4-methyl phenol), 6,6'-heptylidene bis-(2-isobornyl-4-methyl phenol), 6,6'-trichlorethylidene bis-(2-isobornyl-4-methyl phenol).

The following examples illustrate the invention:

EXAMPLE I

One mole of p-cresol and 2 cc. of boron fluoride etherate are placed in a reaction vessel and 1 mole of camphene is added slowly with stirring at 90° C. The rate of addition of the camphene is used to control the reaction temperature between 90° C. and 119° C. After complete addition of the camphene the mixture is heated for 3 hours at 100–110° C. Distillation of this product gives approximately a half-mole of mono-isobornyl-p-cresol, B. P. 120–125° C./1 mm.

One mole of isobornyl-p-cresol and 2 cc. of boron fluoride etherate are mixed and heated to 100° C. To this mixture is added one-half mole of 37% aqueous formaldehyde with stirring. After heating for 2 hours at 100° C., the temperature is raised to 150° C. for ¼ hour and then the product poured onto a porcelain tray to cool. The crude product is ground and washed with water to remove traces of formaldehyde. The washed product is recrystallized from ligroin giving 6,6'-methylene bis-(2-isobornyl-4-methyl phenol) having a constant melting range of 120.5–122° C.

| Analysis | Mol. Wgt. | Percent C | Percent H |
|---|---|---|---|
| Calc'd | 500 | 84.00 | 9.60 |
| Found | 492 | 83.59 | 10.62 |

EXAMPLE II

The product prepared in Example I was incorporated into the following stock for antioxidant tests:

| | |
|---|---|
| Pale crepe | 100 |
| Zinc oxide | 10 |
| Lithopone | 60 |
| Whiting | 60 |
| Zinc laurate | 0.5 |
| Sulfur | 3.0 |
| Tetramethyl thiuram monosulfide | 0.15 |

The antioxidant was incorporated in the ratio of 1.0 part per 100 parts of rubber. Cures were made for 10, 20, and 30 minutes at 30 pounds steam. Table I shows percent tensile retained after aging 96 hours under 300 pounds oxygen pressure at 70° C. and after 48 hours at 100° C. in an air oven; also superiority of the present chemical over 2-isobornyl-4-methyl phenol. The compound of my invention does not appreciably affect the rubber cure, nor does it discolor the rubber nor stain lacquers nor fabric on exposure to sunlight.

*Table I*

| Antioxidant | Percent Tensile Retained After O₂ Aging | Percent Tensile Retained After Heat Aging |
| --- | --- | --- |
| 6,6'-Methylene bis-(2-isobornyl-4-methyl phenol) | 77 | 64 |
| 2-Isobornyl-4-methyl phenol | 67 | 58 |
| None | 15 | 31 |

The antioxidant may be used in crude form as prepared, or in more or less purified forms.

For purposes of retarding the deterioration of the organic material, the amount of the chemical may be varied according to the type and nature of the substance to be treated, being usually in small amounts ranging from 0.1 to 5 percent by weight based on 100 parts of the organic substance.

The rubber may be caoutchouc, balata, gutta percha, reclaimed rubber, rubber isomers, latex whether natural or artificially prepared, or the known synthetic rubbers prepared from butadiene-1,3 alone or copolymerized with styrene, or acrylonitrile, or other synthetic rubbers which are known to be vulcanizable with sulfur. The rubber may or may not be admixed with fillers, pigments, vulcanizing, or accelerating agents.

The antioxidant may be incorporated by milling or similar process, or otherwise, into the unvulcanized or vulcanized rubber, as by surface application as by dipping the rubber or the like in a solution or emulsion of the antioxidant, or by adding it to the latex or other dispersion of the rubber or the like, before, or during coagulation where such is desired.

The antioxidant can be used in any type or form of rubber compositions, such as those used in the manufacture of tire carcasses, inner tubes, insulation, belting, hose, footwear, bath caps, hot water bottles, dipped goods, and the like.

The components of the composition containing the antioxidant may be used in various ratios, and it is not intended to limit the invention to the amounts of ingredients indicated in the example given.

Having thus described my invention, what I claim and desire to protect by Letters Patent is:

1. An organic substance which tends to deteriorate by absorption of oxygen from the air containing in antioxidant amount, a 6,6'-alkylidene bis-(2-isobornyl-4-methyl phenol).

2. An organic substance which tends to deteriorate by absorption of oxygen from the air containing in antioxidant amount, 6,6'-methylene bis-(2-isobornyl-4-methyl phenol).

3. A rubber composition containing in antioxidant amount, a 6,6'-alkylidene bis-(2-isobornyl-4-methyl phenol).

4. A rubber composition containing in antioxidant amount, 6,6'-methylene bis-(2-isobornyl-4-methyl phenol).

THOMAS H. NEWBY.

REFERENCES CITED

The following references are of record in the file of this patent:

UNITED STATES PATENTS

| Number | Name | Date |
| --- | --- | --- |
| 1,989,788 | Calcott et al. | Feb. 5, 1935 |
| 2,471,453 | Rummelsburg | May 31, 1949 |
| 2,537,636 | Kitchen | Jan. 9, 1951 |